(12) United States Patent
Pichetti et al.

(10) Patent No.: US 8,788,642 B2
(45) Date of Patent: Jul. 22, 2014

(54) NETWORK TERMINAL IDENTIFICATION

(75) Inventors: Luigi Pichetti, Rome (IT); Marco Secchi, Rome (IT); Antonio Secomandi, Milan (IT)

(73) Assignee: International Business Machines Corporation, Armonk, NY (US)

( * ) Notice: Subject to any disclaimer, the term of this patent is extended or adjusted under 35 U.S.C. 154(b) by 1481 days.

(21) Appl. No.: 11/938,837

(22) Filed: Nov. 13, 2007

(65) Prior Publication Data

US 2008/0155083 A1 Jun. 26, 2008

(30) Foreign Application Priority Data

Dec. 21, 2006 (EP) .................................. 06126822

(51) Int. Cl.
  *G06F 15/173* (2006.01)
(52) U.S. Cl.
  USPC .............................................. 709/223; 707/4
(58) Field of Classification Search
  USPC .......................................................... 709/224
  See application file for complete search history.

(56) References Cited

U.S. PATENT DOCUMENTS

| | | | |
|---|---|---|---|
| 5,812,865 A | 9/1998 | Theimer et al. | |
| 7,370,362 B2 * | 5/2008 | Olson et al. | 726/25 |
| 7,558,388 B2 * | 7/2009 | Ptasinski | 380/270 |
| 2004/0199661 A1 | 10/2004 | Murdock | |
| 2005/0266798 A1 * | 12/2005 | Moloney et al. | 455/41.2 |
| 2007/0088685 A1 * | 4/2007 | Wilson et al. | 707/4 |
| 2007/0150444 A1 * | 6/2007 | Chesnais et al. | 707/3 |
| 2009/0082020 A1 * | 3/2009 | Ch'ng et al. | 455/435.3 |

FOREIGN PATENT DOCUMENTS

EP 1936890 A1 6/2008

OTHER PUBLICATIONS

The First Office Action, The State Intellectual Property Office of P.R. China, dated May 6, 2010, regarding Application No. CN200710192746.7, 11 pages.
Cuellar et al., "RFC 3693 Geopriv Requirements," IETF ISOC, Feb. 2004, 30 pages. http://www.ietf.org/rfc/rfc3693.txt.
Wharton, "Geographical and Organisational Locality in Active Environments," Proceedings of the ACM SIGOPS European Workshop, Sep. 200, pp. 67-72.
"911 Mass Calls," International Business Machines Corporation, IP.com Prior Art Database Technical Disclosure No. IPCOM000021807D, Feb. 9, 2004, 2 pages.
"Intelligent Addressing Capability for E-mail Systems," International Business Machines Corporation, IP.com Prior Art Database Technical Disclosure No. IPCOM000028248D, May 5, 2004, 4 pages.
Delena et al., "Dynamic Distribution Lists," IP.com Prior Art Datatbase Technical Disclosure No. IPCOM0001099961D, Oct. 1, 1992, 5 pages.

* cited by examiner

*Primary Examiner* — Andrew Goldberg
(74) *Attorney, Agent, or Firm* — Yee & Associates, P.C.; Jeffrey S. LaBaw (57) ABSTRACT

A method of dynamically composing or updating electronic contact lists, such as mailing lists, on the basis of proximity to a particular point or user. By means of this method a user can be offered the option of addressing a method to all "nearby" users. Proximity may be determined with reference to network hardware or other resources associated with each user, for example, LAN segments or wireless access points.

10 Claims, 4 Drawing Sheets

NETWORK TERMINAL IDENTIFICATION

FIELD OF THE INVENTION

The present invention relates to the identification or selection of network terminals, for example, as message destinations.

BACKGROUND OF THE INVENTION

The tools that modern information technology provides allow us to communicate with an ever increasing number of people. However, reaching those particular individuals in our immediate vicinity is often more difficult than it may appear at first sight.

Consider, for example, the steps necessary to send an e-mail message to the individuals working on the same floor of the same building of an individual's office. Just remembering the names of all of the persons will be a problem.

The prior art suggests certain peripherally related arrangements.

As discussed in the article entitled Intelligent Addressing Capability for E-mail systems (ip.com reference IPCOM000028248D), users of electronic mail programs such as IBM's Lotus Notes or Microsoft Hotmail are accustomed to saving contacts in an 'address book' for later lookup and usage. To simplify sending e-mail to a set of users these programs commonly allow the user to set up 'distribution lists' consisting of a name and a subset of the contacts in that person's address book. For instance, a user might set up a distribution list called DEPARTMENT that holds all the people he works with that share his manager. Distribution lists work well when the subset of names is one that the user will want to use again and again, but are cumbersome to set up if used just once, and are also prone to getting 'out of date' quickly. As such, users that have need to contact widely differing subsets of contacts are not greatly assisted by their address book. For example, in the DEPARTMENT distribution list, if people are constantly joining and leaving the dept., the list would need to be continually updated. The notion of 'public' distribution lists helps minimize the impact of such situations. There are times, however, when a user wants to send e-mail to a subset of users based on some property of their stored profile, such as locality, instead of based on pre-determined sets of contacts. This would be useful, for example, in quickly advising users within some geographical radius that a weather advisory was taking effect for the area or that a power outage is scheduled for the neighbourhood, etc. Users might also want to send e-mail to all users based on some complex set of criteria, such as names starting from A to D with known phone numbers that are within 40 miles. Proposed is an automated algorithm that would be constructed as part of the address book (AB) component of an e-mail system. To enable users to send e-mail to users within a geographical radius, the address book would be able to query an address server (such as MapQuest, for example) to determine the distance of users from a targeted central address (as-the-crow-flies or best-street-driving algorithms) or via CPS attributes, for instance. In this way, a user is empowered to send an e-mail to a street address and radius. The address book could be enabled to cache this locality information to reduce the number of times it needs to query the server for information (e.g. if a user sends an e-mail to all users within a 50 mile radius and then all users within a 40 mile radius of the same address, the AB might not need to ask the server for the same distance information again).

The article entitled "911 Mass Calls" (ip.com reference IPCOM000021807D) meanwhile discloses a system that will warn members of the public that are close to a dangerous situation such as a fire in a tunnel, a major traffic jam or any tragedy. The goal is to have the public avoid dangerous situations or conditions so as to not to add to the danger and confusion. It is difficult to contact everyone at the same time, especially when a central speaker system is not available. In recent tragedies, like the tunnel fires in Austria, it would have been beneficial to contact the people who were riding in the cars and approaching the tunnel. Rapid communication is always a problem in such events, as they occur unexpectedly and there is a lack of knowledge on the part of the people involved in the tragedy as to how to contact the people who would benefit from knowing how to avoid the incident. With the current state of technology, the geographic position of cellular phones is known by the equipment and systems of the telephone provider. As a result, this warning system would be able to identify cellular phones that are located within the danger area, or are approaching the area and then use that information to send warning messages and instructions to those cellular phones. When an accident or other emergency occurs, or is about to occur, a traffic emergency service is contacted. The location of the incident is determined from the call in one of the following ways: it is provided by the caller, localization of the regular telephone or by using position information from the cellular phone provider. The danger area, as well as the estimated duration thereof, is determined based on the type of disaster. For example: spreading chemicals require increased attention in a relatively greater area. The warning system is initiated. Using the location information, a query is run on the available records of the telephone providers to search for cellular phones that are within the danger area. The query may be optionally restricted to the coordinates on which a road is situated. Users may subscribe to this warning system to be notified whenever an incident occurs in close proximity to them. A list of these identified cellular phones is built and messages are sent to the people who have subscribed to the warning system. The warning system will interrupt any ongoing conversation that is active on those phones and then provide them with a warning message. In addition to the query of cellular phones within the danger area, a query is run on cellular phones approaching the danger area and on the phones of those who would enter the danger area within a certain time period. The phones that are selected are located on the roads that have been identified from the map coordinates of the danger area. This query is based on the location of the phone at the current time of the incident in combination with the location of the phone a time period before. The system calculates the direction and velocity of the phone user, and determines if action should be taken. If action has to be taken, the phone user is contacted either through SMS or voice, then instructions are provided.

The publication entitled "Dynamic Distribution Lists" (ip.com reference IPCOM000109996D) finally describes Dynamic Distribution List, also known as a Search List, an object for director systems. The contents of a conventional distribution list are established via the manual action of adding or removing members. Conversely, the contents of a Search List are established via sophisticated exclusion and inclusion criteria against the director database.

Figure 1:
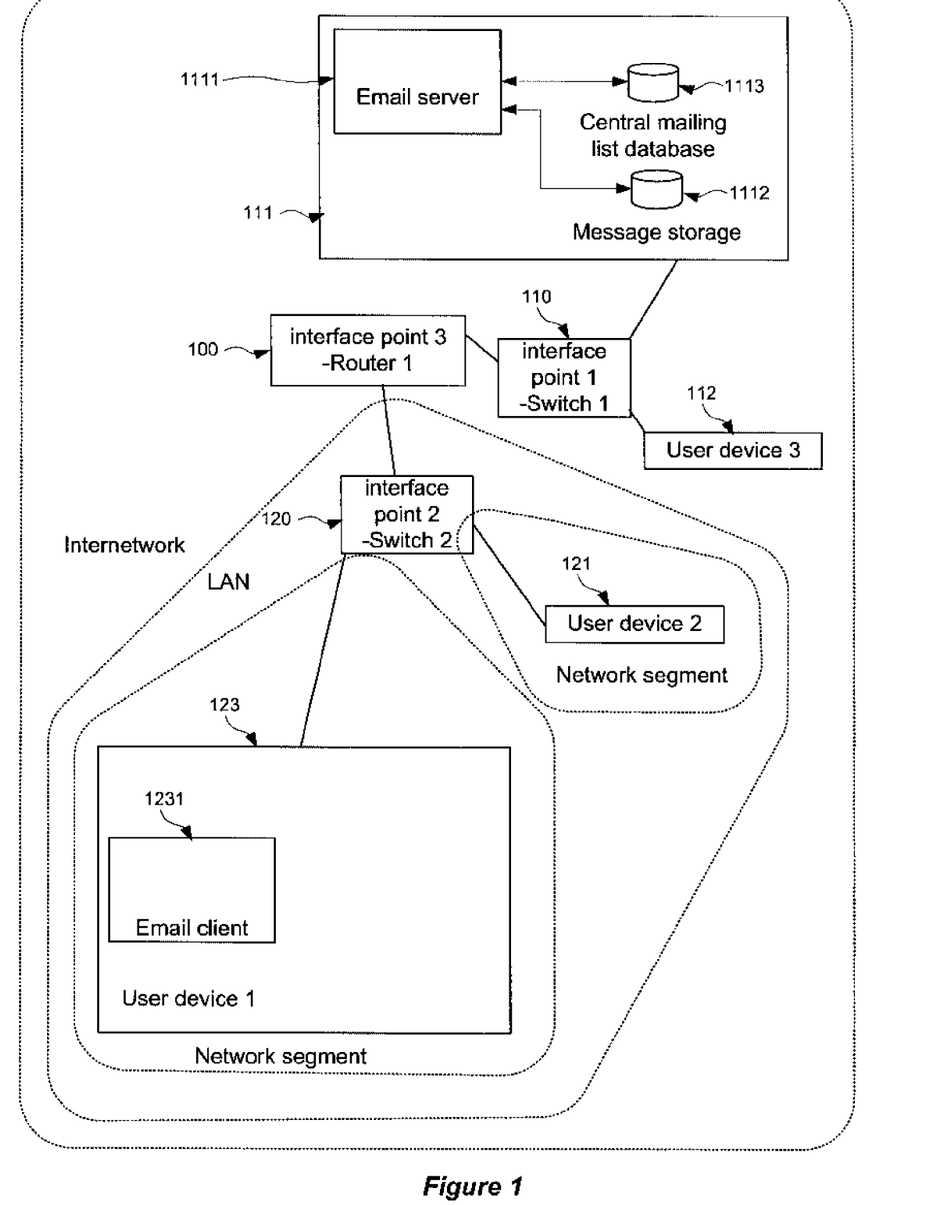
FIG. 1 shows a conventional network architecture.

Search lists are indispensable in environments where there is constant information flux, as they require no maintenance to always be up to date. FIG. 1 shows a search list that when opened, correctly displays the members of department 123. If an individual transfers out of that department, he or she immediately disappears from the list. Because the inclusion mechanism is a search criteria (in this case "including members whose department equals 123"), this Search List never needs updating.

A dialog box is shown that enables the end user to create Search Lists. This is a dialog box from the IBM OS/2* product, where Search Lists are currently in use. In OS/2, Search Lists are key elements in sending mail and automated phone dialing. The criteria is entered by the end user and saved for future use. Internally, and unbeknownst to the end user, the criteria is translated to a Structured Query Language (SQL) statement that is understood by the relational directory system, and stored. When the Search List is opened to display its members, or when it is used to address a piece of mail or to dial the telephone, the SQL statement is executed and immediately produces the members that match the criteria. The criteria that can be specified is limited only by the power of SQL, so therefore complex Search Lists may be created.

Returning to the original communication problem, inside a building the best solution that the existing technology provides is a public distribution list, however based on the dimension of the building, and based on the ratio of movements that the peoples are subject to the setup and maintenance of such list may result very expensive and not effective.

The same limitations will apply in a number of circumstances for example if instead of sending an e-mail it may be desirable to send an instant message such as a lotus (RTM) sametime (RTM) message.

The lack of a reliable and updated group of users based on the proximity to us will limit our possibility to communicate with the people that are working and living close to us.

SUMMARY OF THE INVENTION

The prior art approach of compiling a mailing list on the basis of geographical proximity determined on the basis of GPS data has a number of drawbacks, for example in view of the requirement for all correspondents to be equipped with GPS hardware, inherent disadvantages of GPS such as the inability to work within buildings and the need for periodic polling of the correspondents. These drawbacks are particularly apparent in a case where correspondents to be added to a list are in close proximity, for example within the same building. It is an objective o the present invention to address these drawbacks.

Accordingly, there is provided a network terminal identification method for use in a data network comprising a plurality of uniquely identifiable interface points, the method comprising the steps of logging the identity of a plurality of terminal devices each with an associated interface point identity in an identity log; determining the identity of a requesting interface point being the interface point associated with a requesting terminal device; identifying terminal devices connected to interface points having a predetermined physical relationship with said requesting interface point with reference to said identity log; and making available the results of said step of identifying to said requesting terminal device.

Further according to the present invention there is provided a system comprising means adapted to carry out the steps of the method described above.

Further according to the present invention there is provided a computer program comprising instructions for carrying out the steps of the method described above when said computer program is executed on a device.

Further according to the present invention there is provided a computer readable medium having encoded thereon a computer program as described above.

The automatic creation and maintenance of identity groups prevents the manual overhead that would instead be required, thus reducing the cost and increasing updates accuracy.

Given the established identity group, the communication between the people that are logically close to each other will be much easier, reducing the need of broader message posting and therefore reducing the information traffic.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION OF THE PREFERRED EMBODIMENT

This disclosure is related to the possibility of automatically create and maintain group of users (identity groups) based on the distance that the hardware devices by which they are connected have between each other.

FIG. 1 shows conventional network architecture. This architecture comprises a first interface point 100 and a second interface point 110 and third interface point 120, both connected to the first interface point 100. There are further provided a first user device 123 and a second user device 121 connected to the third interface point 120 and a third user device 112 and a server 111 connected to the second interface point 110. The first, second and third interface points may be network Bridges, repeaters, network hubs, routers, switches, wireless access points etc. For illustrative purposes it will be assumed that the first interface point 100 is a router, and the second and third interface points are switches defining separate LAN segments. The interface points collaborate to pass traffic between user devices in a manner which will be familiar to the skilled person depending on the implementation details of the network itself. Each user device has a unique identifier, which in the case of a local area network may be the MAC address associated with its network adapter. Or an IP address, such as a local IP address, assigned to that device. Such addresses are used in accordance with the various network protocols in use to enable the interface devices to pass messages data from one user device to another.

Certain user devices may offer email functions, for example by running email client software 1231. As shown, the server 111 provides an email server function 1111. Typically a message sent in such a system composed on email client software 1231 is relayed to the server 111 and stored in a storage database 1112 managed by the email server 1111. Other user devices may run client software which will periodically poll email server 1111 to determine whether the storage database 1112 contains a new message for a user presently logged on to the user device in question. If such a message is found, it will be retrieved by the client software for storage on the destination user device. Naturally, many other transmission mechanisms may be envisaged, for example with the message being "pushed" from the server to the client without the client needing to poll the server.

In such configurations, the server will generally also manage a list or database 1113 containing addresses for all authorized users for whom a message account has been established.

Either the email server 1111 or the client 1231 may offer features enabling a user to define a group of addresses, or identity group, so that a user may identify the group as a whole as the addressees of a particular message.

Conventionally, user devices will tend to be positioned physically near to the interface point through which they are connected to the network. This is generally due at least in part to physical limitations of the transmission medium through which the user device and the interface point to which it is connected communicate, for example in terms of a maximum cable length, or the transmission range of a radio link bearing in mind interposed physical barriers. It is often also convenient from a logistical point of view to handle physically proximate user devices with the same network hardware.

It is proposed to provide a system that would allow for the automatic creation and maintenance of identity groups (Email Addresses, Lotus Sametime (RTM) IDs and Active Account Names) based on the distance that the hardware devices have between each other.

Figure 2:
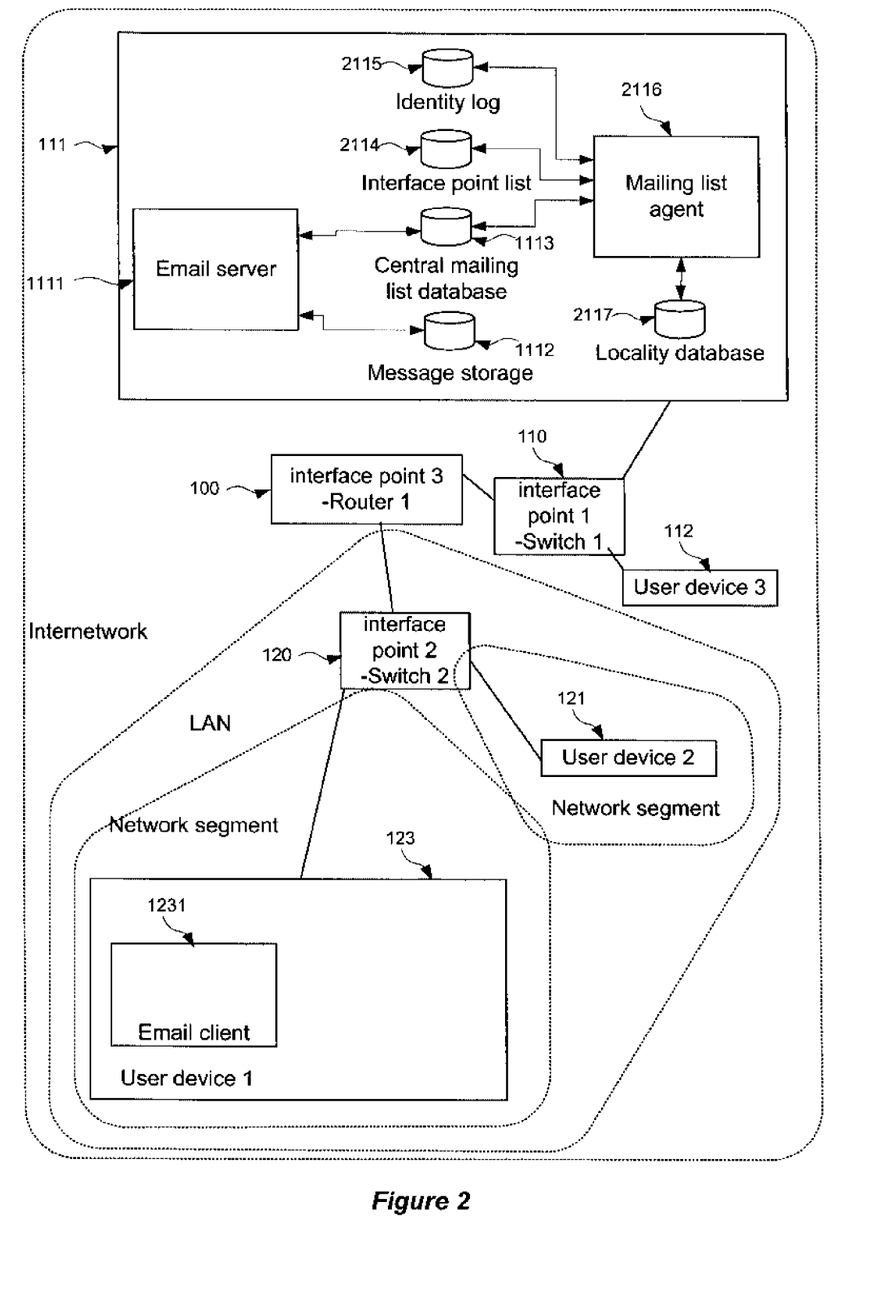
FIG. 2 shows a conventional computer network modified in accordance with a first embodiment of the invention.

FIG. 2 shows a conventional computer network modified in accordance with a first embodiment of the invention. FIG. 2 shows a network substantially as described above with respect to FIG. 1, with the server 111 additionally being provided with a mailing list agent 2116 in communication with an interface point list 2114 and an identity log 2115. The mailing list agent 2116 is furthermore in communication with the central mailing list database 1113.

The interface point list contains a list of uniquely identifiable interface points belonging to the network. The list uniquely identifies each interface point, by means for example of its IP address, MAC id, IMSI etc. and further notes the physical location of each of respective interface point. According to certain embodiments, the physical location may treated as being implicit from the interface point ID itself, and no further information provided. Otherwise, the list may be compiled manually, for example, by a system administrator, or it may advantageously be at least partially automated, for example the mailing list agent may automatically detect the connection of a previously unknown interface point, and prompt a system administrator or other suitable user to define the location of the new interface point.

The identity log contains a log of uniquely identifiable terminal devices such as computer terminals, PDAs, telephone handsets etc. and the interface point to which they are connected. According to certain embodiments, this list may be generated by the mailing list agent "on the fly" when a mailing list is required by broadcasting a request that all terminal devices identify themselves. Otherwise, the log may be maintained by the mailing list agent on an ongoing basis, whereby whenever a new device is connected to the network its details are recorded, either as entered by a user, or preferably as determined automatically by means of existing network protocols. The information may be submitted to the mailing list agent by the terminal device itself, or by the interface device to which it is connected.

By way of example, the Interface point list and identity log compiled for the network configuration of FIG. 2 may be as shown below:
   Interface point list
   Interface point 1
   Interface point 2
   Interface point 3
   Identity log
   User device 1 Interface point 2
   User device 2 Interface point 2
   User device 3 Interface point 1

When a user desires that a mailing list for nearby recipients be provided, the user device they are using submits a request message to the mailing list agent. The mailing list agent must first determine the location of the user in question, or more specifically, the location of the device from which the request is made. This may be achieved, for example, by deriving identity of the interface point to which the requesting user device is connected (hereafter referred to as the first interface point), for example by analysis of the request message itself, which in some cases may reflect the identities of the network devices through which the message has passed. The requesting device may also itself determine the identity of the interface point to which it is connected. Further still, the identity of the interface point to which the requesting device is connected may be determined by looking up the entry for the user device in question in the identity log 2115.

Finally, terminal devices connected to interface points having a predetermined physical relationship with the first interface point with reference to said list of uniquely identifiable interface points are identified. This is achieved with reference to the identity log and possibly the interface point list. In embodiments where the physical relationship required is considered to approximate simply to user devices connected to the same interface point, it is sufficient simply to process the identity log to identify user devices connected to the same interface point. Once such user devices have been identified, the central mailing list database 113 can be consulted to associate messaging addresses with particular user devices, and thereby compile the requisite mailing list. The mailing list may be added to the central mailing list database 1113, or transferred to a local mailing list database stored at the user device as required.

The physical relationship required may be specified by the user them self, and as required in the message submitted to the mailing list agent.

It may further be envisaged that the identity log 2115 may store a more complete representation of the structure of the network to which the first user device 123 is connected. For example, the identity log 2115 may store not only the identity of the interface point to which each user device is connected, but also interface points further up the hierarchy. In the case of the exemplary network structure shown in FIG. 2, the Identity log might also reflect the fact that at one step removed from the interface point to which each user device is directly connected, all of the devices are connected to the router 1-interface point 3-100. Such a data structure is shown below.
   Interface point list
   Interface point 1
   Interface point 2
   Interface point 3
   Identity log
   User device 1 Interface point 2 Interface point 3
   User device 2 Interface point 2 Interface point 3
   User device 3 Interface point 1 Interface point 3

On the basis of such an identity log, it would be possible for the mailing list agent to prepare a mailing list for the users of all user devices connected to the interface point 3, thereby including the users of user devices 1, 2 and 3. One approach may be for the user requesting a custom mailing list from the mailing list agent to specify the number of steps up the network hierarchy to be included in the mailing list composition, on the basis that the higher the hierarchical connection, the broader the scope of physical proximity will be.

It may further be envisaged that the Interface point list 2114 may store information pertaining to physical location of each interface point. For example, the Interface point list 2114 may store not only the identity of each interface point, but also define the location of the interface point in some manner. For example, there may be defined a grid reference, or latitude and longitude pair.

Interface point list
Interface point 1 43°43'55.28 N 7°10'02.26 E
Interface point 2 43°43'55.29 N 7°10'02.25 E
Interface point 3 43°43'55.30 N 7°10'02.24 E
Identity log
User device 1 Interface point 2 Interface point 3
User device 2 Interface point 2 Interface point 3
User device 3 Interface point 1 Interface point 3

In this case, the mailing list agent could prepare a mailing list for all interface points within a given radius of the interface point of the requesting user device.

Still further, functionality could be added by including altitude data:

Interface point list
Interface point 1 43°43'55.28 N 7°10'02.26 E 270 m
Interface point 2 43°43'55.29 N 7°10'02.25 E 270 m
Interface point 3 43°43'55.30 N 7°10'02.24 E 267 m
Identity log
User device 1 Interface point 2 Interface point 3
User device 2 Interface point 2 Interface point 3
User device 3 Interface point 1 Interface point 3

Or merely a floor number:

Interface point list
Interface point 1 43°43'55.28 N 7°10'02.26 E flr2
Interface point 2 43°43'55.29 N 7°10'02.25 E flr2
Interface point 3 43°43'55.30 N 7°10'02.24 E flr1
Identity log
User device 1 Interface point 2 Interface point 3
User device 2 Interface point 2 Interface point 3
User device 3 Interface point 1 Interface point 3

By this means, the mailing list could simply be prepared to include only interface points on the same floor.

Still further, arbitrary classifications may be added, such as room numbers, building, wing or area classifiers, enabling a mailing list to be restricted to a particular such designated areas. As a development of this concept, there may be provided a locality database 2117 which may define the spatial relationships of such arbitrary classifications. This would allow the mailing list agent to offer the preparation of mailing lists on a more sophisticated basis so as to include adjacent or connected areas.

Any of the above approaches may of course be applied in combination. Mailing lists may be generated on demand, or may be continually updated to as to propose mailing lists for local users when required. A mailing list once generated on demand may thereafter be maintained for future use.

We may thus imagine a practical scenario in which a user reaches the printer area to collect a printed document and finds a pair of keys. The keys were likely lost by someone using the same printer and therefore someone that is close to the user.

Without the benefit of the present invention, the keys are likely to be left around in a visible position with unpredictable and often unsatisfactory results.

Leveraging the Identity Group based on Hardware Proximity as described above the user can send an message, for example from his workstation, the PDA or smartphone they are carrying, or indeed from the printer itself, to the automatically maintained alias named "users close to me" announcing that a pair of keys were found.

Figure 3:
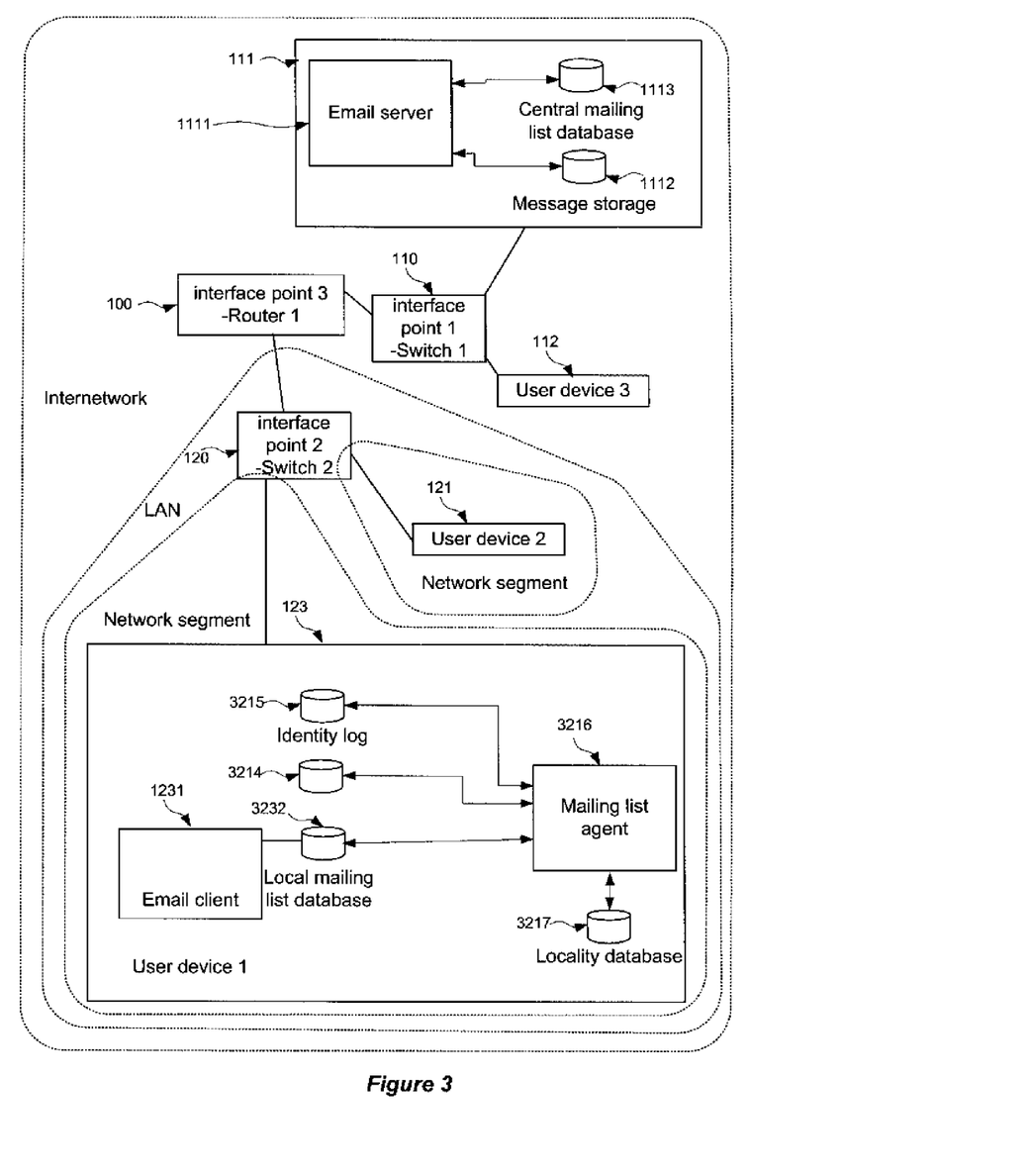
FIG. 3 shows a conventional computer network modified in accordance with a second embodiment of the invention.

FIG. 3 shows a conventional computer network modified in accordance with a second embodiment of the invention. FIG. 3 shows a network substantially as described above with respect to FIG. 1, with the user device 123 additionally being provided with a mailing list agent 3216 in communication with an interface point list 3214 and an identity log 3215. The mailing list agent 3216 is furthermore in communication with the local mailing list database 3232 of the user device 123.

According to this second embodiment, the features described with respect to the first embodiment as performed by the mailing list agent 2116 are carried out by the mailing list agent 3216, that is, by processes running at the user device 123 requiring a custom mailing list. In such a case, the user device itself will be responsible for gathering and storing the requisite data from the network, and as such may still be considered as exhibiting server functionality. Such an approach may be particularly compatible with aspects of the invention described above where information is gathered "on the fly" in order to prepare the mailing list. Mailing lists thus generated may be added, for example, to the local mailing list database 3232

According to still further embodiments, the various elements described above may be distributed throughout the network. The various lists, logs and databases may be stored, for example, at any convenient location and accessed as required. Similarly, the agents and servers implementing the steps of the invention may be executed at any convenient point in the network.

Figure 4:
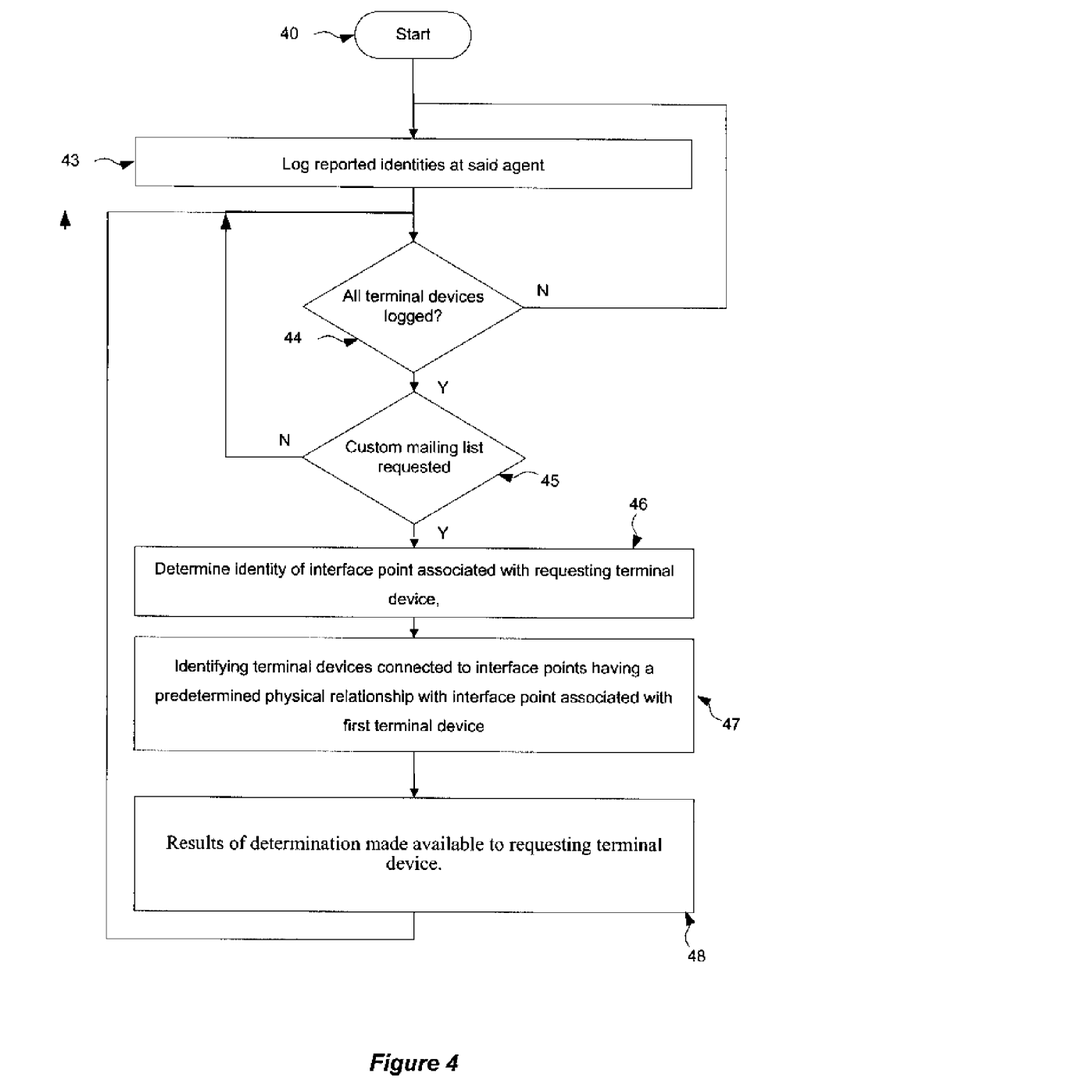
FIG. 4 shows by way of example a flowchart of certain steps implementing either of the above described embodiments.

FIG. 4 shows by way of example a flowchart of certain steps implementing either of the above described embodiments. The method shown in FIG. 4 starts at step 43, of logging the identity of a plurality of each terminal device, each with an associated interface point identity, i.e. the identity of the interface point to which that terminal device is first connected in an identity log 2115;3215. If it is determined at step 44 that terminal devices remain to be logged, the method loops back to step 43. Where it is determine that all terminal devices have been logged, the method proceeds to step 45, at which it is determined whether a custom (new or updated) mailing list is presently required. If it is determined that a mailing list is required, the method proceeds to step 46, otherwise the method loops back to step 44. At step 46 the method proceeds to determine the identity of a first interface point, that is, the interface point associated with a terminal device requesting the mailing list, then at step 47 terminal devices connected to interface points having a predetermined physical relationship with the first interface point are identified. At step 48 the results of this determination are made available to the requesting terminal device. This may be by way of explicitly identifying the terminal devices to the requesting device, e.g. by means of a list of identities or a mailing list, or by providing an alias allowing the requesting device to refer to the identified devices indirectly, for example referring to a remotely stored and defined mailing list, or otherwise.

The method may then return to step 44.

Preferably there may be provided a further step of compiling a list of the uniquely identifiable interface points, and which still more preferably describes the physical location of each of said uniquely identifiable interface points, in which case at step 44 reference may be made to the list of uniquely identifiable interface points to identify nearby interface points.

The method preferably comprises the further step of returning details of all said terminal devices connected to interface points having a predetermined physical relationship with said first terminal device to said first terminal device after step 47.

The method preferably comprises the further steps of compiling a mailing list incorporating all said terminal devices connected to interface points having a predetermined physical relationship with said first terminal device to said first terminal device after step 47.

Although the invention has been described in terms of a conventional Ethernet type network, the skilled person will appreciate that many other communication or data networks offer equivalent features and components to which the invention can be adapted. For example, cellular or fixed telephone networks, or larger data networks such as a WAN or indeed the internet itself exhibit some concordance between physical location and the interface points through which a connection is made.

According to certain embodiments there is provided a method of dynamically composing or updating electronic contact lists such as mailing lists on the basis of proximity to a particular point or user. By means of this method, a user can be offered the option of addressing a method to all "nearby" users. Proximity may be determined with reference for example to network hardware or other resources associated with each user, for example LAN segments, wireless access points, etc.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be (1) a computer readable storage medium including an electronic, magnetic, optical, electromagnetic, infrared, or semiconductor system (or apparatus or device) or (2) a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A network terminal identification method for use in a data network comprising a plurality of uniquely identifiable interface points, said method comprising the steps of:
    logging the identity of a plurality of terminal devices each with an associated interface point identity in an identity log;
    determining the identity of a requesting interface point being the interface point associated with a requesting terminal device;
    identifying terminal devices connected to interface points having a predetermined physical relationship with said requesting interface point with reference to said identity log;
    making available the results of said step of identifying to said requesting terminal device; and
    compiling a list of said uniquely identifiable interface points, and wherein said step of identifying terminal devices connected to interface points having the predetermined physical relationship is made with reference to said list of uniquely identifiable interface points, wherein said step of determining the position of said requesting terminal device, and said step of identifying terminal devices connected to interface points having a predetermined physical relationship with said requesting terminal device, are carried out responsive to receiving a request from said requesting terminal device, and wherein the position of said requesting terminal device is determined by extracting routing data identifying said interface points through which said request was conveyed from said requesting terminal device and comparing the interface points thus identified to said list of uniquely identifiable interface points, wherein at least some of said interface points are hierarchical with respect to one another.

2. The method of claim 1 wherein said list describes the physical location of each of said uniquely identifiable interface points.

3. The method of claim 1 wherein said logging, determining, identifying, making and compiling steps are performed by an agent, and wherein said agent is incorporated in said requesting terminal device.

4. The method of claim 1 wherein said logging, determining, identifying, making and compiling steps are performed by an agent, and wherein said agent is incorporated in a server.

5. The method of claim 1 wherein said step of making available the results of said step of identifying to said requesting terminal device comprises compiling a mailing list incorporating all said terminal devices connected to said interface points having said predetermined physical relationship with said requesting interface point.

6. The method of claim 5 wherein said mailing list is formed and stored at said server.

7. The method of claim 1 wherein said predetermined physical relationship of proximity is defined in terms of interface points within a predetermined radius in three dimensional space or in two dimensional space, disregarding the vertical axis.

8. The method of claim 1 wherein said predetermined physical relationship of proximity is defined in terms of interface points falling within a predetermined space of arbitrary shape.

9. The method of claim 8 wherein said a predetermined space corresponds to a campus, a building, a floor of a building, a wing of a building, or a particular room.

10. A network terminal identification method for use in a data network comprising a plurality of uniquely identifiable interface points, said method comprising the steps of:
- logging the identity of a plurality of terminal devices each with an associated interface point identity in an identity log;
- determining the identity of a requesting interface point being the interface point associated with a requesting terminal device; and
- identifying terminal devices connected to interface points having a predetermined physical relationship with said requesting interface point with reference to said identity log;
- making available the results of said step of identifying to said requesting terminal device;
- wherein said step of determining the position of said requesting terminal device, and said step of identifying terminal devices connected to interface points having a predetermined physical relationship with said requesting terminal device, are carried out responsive to receiving a request from said requesting terminal device, and wherein the position of said requesting terminal device is determined by extracting identity details from said request and comparing these to said identity log to determine an associated interface point associated with a given terminal device of the plurality of terminal devices, and comparing the associated interface point thus identified to said list of uniquely identifiable interface points.

* * * * *